(12) United States Patent
Grammatikakis et al.

(10) Patent No.: US 10,506,078 B2
(45) Date of Patent: Dec. 10, 2019

(54) CENTRALIZED OVERVIEW DISPLAY GENERATED FROM ANNOTATED DATA SOURCES

(71) Applicant: SAP Portals Israel Ltd., Ra'anana (IL)

(72) Inventors: Ioannis Grammatikakis, Maxdorf (DE); Ran Gross, Rosh-Haain (IL); Stefan Kusterer, Nussloch (DE); Ariel Bentolila, Herzelia (IL); Tim Back, Mannheim (DE); Aviad Gilady, Kerem Ben Shemen (IL); Itay Sagiv, Hadera (IL)

(73) Assignee: SAP Portals Israel Ltd., Ra'anana (IL)

( * ) Notice: Subject to any disclaimer, the term of this patent is extended or adjusted under 35 U.S.C. 154(b) by 314 days.

(21) Appl. No.: 15/198,076

(22) Filed: Jun. 30, 2016

(65) Prior Publication Data
US 2018/0004543 A1    Jan. 4, 2018

(51) Int. Cl.
| | | |
|---|---|---|
| *G06F 3/00* | (2006.01) | |
| *H04L 29/06* | (2006.01) | |
| *G06F 17/24* | (2006.01) | |
| *G06F 9/451* | (2018.01) | |
| *G06F 8/38* | (2018.01) | |

(52) U.S. Cl.
CPC .......... *H04L 67/42* (2013.01); *G06F 8/38* (2013.01); *G06F 9/451* (2018.02); *G06F 17/241* (2013.01)

(58) Field of Classification Search
CPC . H04L 67/42; G06F 9/451; G06F 8/38; G06F 17/241

USPC ......................................................... 715/744
See application file for complete search history.

(56) References Cited

U.S. PATENT DOCUMENTS

| | | |
|---|---|---|
| 7,526,754 B2 | 4/2009 | Bentolila |
| 7,681,202 B2 | 3/2010 | Pik et al. |
| 7,685,268 B2 | 3/2010 | Brunswig et al. |
| 7,716,640 B2 | 5/2010 | Pik et al. |
| 7,757,208 B2 | 7/2010 | Degenkolb et al. |
| 7,890,959 B2 | 2/2011 | Brunswig et al. |
| 8,407,309 B1 | 3/2013 | Feldman et al. |
| 8,452,722 B2 | 5/2013 | Naeve et al. |
| 8,510,373 B2 | 8/2013 | Demant et al. |
| 8,516,364 B2 | 8/2013 | Demant et al. |
| 8,544,027 B2 | 9/2013 | Demant et al. |
| 8,555,249 B2 | 10/2013 | Demant et al. |

(Continued)

*Primary Examiner* — Anil N Kumar
(74) *Attorney, Agent, or Firm* — Fish & Richardson P.C.

(57) ABSTRACT

The present disclosure involves systems, software, and computer implemented methods for generating a centralized overview display from annotated data sources. One example method includes identifying data sources that each include data to be presented in a user interface. A set of annotations are identified, for each data source, that describe the data included in the respective data source. One or more visual representation types are associated with each data source. Each visual representation type indicates a type of visual representation to apply when rendering data included in the associated data source. A user interface configuration is generated based on the data sources, the annotations, and the associations between the visual representation types and the associated data sources. The user interface is automatically rendered by analyzing and processing the user interface configuration, including rendering, for each association, data from the associated data source according to the associated visual representation.

16 Claims, 8 Drawing Sheets

(56) References Cited

U.S. PATENT DOCUMENTS

| | | |
|---|---|---|
| 8,589,883 B2 | 11/2013 | Demant et al. |
| 8,694,544 B2 | 4/2014 | Demant et al. |
| 8,751,558 B2 | 6/2014 | Bleier et al. |
| 8,881,056 B2 | 11/2014 | Demant et al. |
| 8,930,441 B2 | 1/2015 | Demant et al. |
| 9,110,765 B2 | 8/2015 | Bolotnikoff et al. |
| 9,213,954 B2 | 12/2015 | Khalatov et al. |
| 9,218,189 B2 | 12/2015 | Vainer et al. |
| 9,244,697 B2 | 1/2016 | Schlarb et al. |
| 9,245,245 B2 | 1/2016 | Sherman et al. |
| 2005/0262480 A1 | 11/2005 | Pik et al. |
| 2006/0041890 A1 | 2/2006 | Pik et al. |
| 2006/0195823 A1 | 8/2006 | Bentolila et al. |
| 2006/0230234 A1 | 10/2006 | Bentolila et al. |
| 2006/0282819 A1* | 12/2006 | Graham ................ G06F 17/241 717/113 |
| 2007/0300243 A1 | 12/2007 | Gross et al. |
| 2008/0244616 A1 | 10/2008 | Brunswig et al. |
| 2009/0240653 A1* | 9/2009 | Kistler .................. G01C 15/00 |
| 2011/0137909 A1 | 6/2011 | Guertler et al. |
| 2011/0173572 A1* | 7/2011 | van Zwol .............. G06N 7/005 715/856 |
| 2012/0023154 A1 | 1/2012 | Demant et al. |
| 2012/0023421 A1 | 1/2012 | Demant et al. |
| 2012/0030664 A1 | 2/2012 | Demant et al. |
| 2012/0054602 A1 | 3/2012 | Demant et al. |
| 2012/0179513 A1* | 7/2012 | Siklos ............. G06Q 10/06393 705/7.39 |
| 2013/0086495 A1 | 4/2013 | Guzansky et al. |

\* cited by examiner

```
{
    "_version": "1.1.0",
    "start_url": "start.html",

"test.app": {
        "_version": "1.1.0",
        "id": "test.ovp.demo",
        "type": "application",
        "i18n": "i18n/i18n.properties",
        "applicationVersion": {
            "version": "1.2.2"
        },
        "title": "{{app_title}}",
        "description": "{{app_description}}",
        "dataSources": {
            "salesOrder": {
                "uri": "/test/opu/odata/IWBEP/GWSAMPLE_BASIC/",
                "type": "OData",
                "settings": {
                    "odataVersion": "2.0",
                    "annotations": [
                        "salesOrderAnno"
                    ]
                }
            },
            "salesOrderAnno": {
                "uri": "data/salesorder/annotations.xml",
                "type": "ODataAnnotation",
                "settings": {
                }
            },
            "purchaseOrder": {
                "uri": "/test/opu/odata/ZME_OVERDUE_CDS_LOC/",
                "type": "OData",
                "settings": {
                    "odataVersion": "2.0",
                    "annotations": [
                        "purchaseOrderAnno"
                    ]
                }
            },
            "purchaseOrderAnno": {
                "uri": "data/purchaseorder/annotations.xml",
                "type": "ODataAnnotation",
                "settings": {
                }
            }
        }
    },
}
```

```
"test.ovp": {
  "globalFilterModel": "salesOrder",
  "globalFilterEntityType": "GlobalFilters",
  "cards": {
    "card00": {
      "model": "salesOrder",
      "template": "test.ovp.cards.stack",
      "settings": {
        "category": "Contacts",
        "title": "My Team",
        "description": "Stack Card",
        "entitySet": "SalesOrderSet" }},
    "card01": {
      "model": "salesOrder",
      "template": "test.ovp.cards.image",
      "settings": {
        "entitySet": "SalesOrderSet",
        "category": "Image Card",
        "imageUrl": "img/app_object_header.jpg" }},
    "card02": {
      "model": "salesOrder",
      "template": "test.ovp.cards.list",
      "settings": {
        "category": "Sales Orders - listType = condensed",
        "title": "",
        "description": "",
        "listType": "condensed",
        "entitySet": "SalesOrderSet" }},
    "card03": {
      "model": "purchaseOrder",
      "template": "test.ovp.cards.list",
      "settings": {
        "category": "Overdue Purchase Orders - listType = extended",
        "title": "{{card3_title}}",
        "description": "{{card3_description}}",
        "listType": "extended",
        "entitySet": "Zme_Overdue",
        "sortBy": "OverdueTime" }},
    "card04": {
      "model": "purchaseOrder",
      "template": "test.ovp.cards.list",
      "settings": {
        "title": "{{card3_title}}",
        "description": "{{card3_description}}",
        "category": "Overdue Purchase Orders - listType = condensed",
        "listType": "condensed",
        "entitySet": "Zme_Overdue",
        "sortBy": "OverdueTime" }},
    "card05": {
      "model": "purchaseOrder",
      "template": "test.ovp.cards.table",
      "settings": {
        "title": "{{card3_title}}",
        "description": "{{card3_description}}",
        "category": "Overdue Purchase Orders - listType = condensed",
        "entitySet": "Zme_Overdue",
        "sortBy": "OverdueTime" }},
    "card06": {
      "id": "card3",
      "model": "salesOrder",
      "template": "test.ovp.cards.list",
      "settings": {
        "category": "Sales Order - Line Items - listType = extended",
        "title": "",
        "description": "",
        "listType": "extended",
        "entitySet": "SalesOrderSet" }},
    "card07": {
      "model": "salesOrder",
      "template": "test.ovp.cards.table",
      "settings": {
        "category": "Sales Order Line Items Set",
        "entitySet": "SalesOrderLineItemSet" }},
    "card08": {
      "model": "salesOrder",
      "template": "test.ovp.cards.list",
      "settings": {
        "category": "Sales Orders - listType = Condensed Bar List",
        "title": "Bar List Card",
        "description": "",
        "listType": "condensed",
        "listFlavor": "bar",
        "entitySet": "ProductSet" }},
    "card09": {
      "model": "salesOrder",
      "template": "test.ovp.cards.list",
      "settings": {
        "category": "Sales Orders - listType = Extended Bar List",
        "title": "Bar List Card",
        "description": "",
        "listType": "extended",
        "listFlavor": "bar",
        "entitySet": "ProductSet" }},
```

```xml
<edmx:DataServices>
<Schema Namespace="sample_anno_mdl.v1" xmlns="http://docs.oasis-open.org/odata/ns/edm">
<Annotations Target="GWSAMPLE_BASIC.Product/WeightMeasure">
    <Annotation Term="Org.OData.Measures.V1.Unit" Path="WeightUnit"/>   704
</Annotations>
<Annotations Target="GWSAMPLE_BASIC.Product/Width">   702
    <Annotation Term="Org.OData.Measures.V1.Unit" Path="DimUnit"/>
</Annotations>
<Annotations Target="GWSAMPLE_BASIC.Product1/Price">
    <Annotation Term="Org.OData.Measures.V1.Unit" String="$"/>   708   706
</Annotations>
<Annotations Target="GWSAMPLE_BASIC.Product/Height">
    <Annotation Term="Org.OData.Measures.V1.Unit" Path="DimUnit"/>
</Annotations>   712                                                          710
<Annotations Target="GWSAMPLE_BASIC.Product/Price">
    <Annotation Term="Org.OData.Measures.V1.ISOCurrency" Path="CurrencyCode"/>
</Annotations>   716   714
<Annotations Target="GWSAMPLE_BASIC.Product/Category">
    <Annotation Term="com.test.vocabularies.Common.v1.ValueList">
        <Record Type="com.test.vocabularies.Common.v1.ValueListType">
            <PropertyValue Property="CollectionPath" String="VH_CategorySet"/>
            <PropertyValue Property="Parameters">
                <Collection>
                    <Record Type="com.test.vocabularies.Common.v1.ValueListParameterInOut">
                        <PropertyValue Property="LocalDataProperty" Path="Category"/>
                        <PropertyValue Property="ValueListProperty" Path="Category"/>
                    </Record>
                </Collection>
            </PropertyValue>
        </Record>
    </Annotation>
</Annotations>
```

700

US 10,506,078 B2

CENTRALIZED OVERVIEW DISPLAY GENERATED FROM ANNOTATED DATA SOURCES

TECHNICAL FIELD

The present disclosure relates to computer-implemented methods, software, and systems for generating a centralized overview display from annotated data sources.

BACKGROUND

Enterprise portals are frameworks for integrating information, people, and processes across organizational boundaries. Portals can provide a secure unified access point, often in the form of a web-based user interface, and are designed to aggregate and personalize information through application-specific portlets and components. One hallmark of enterprise portals is the decentralized content contribution and content management, which keeps the information always updated. In many cases, specific portal pages may be defined by a highly experienced administrator using a portal content administration environment or a key user within a particular organization using specific tools to define aspects, relationships, and connections for and between content provided within specific portal pages.

SUMMARY

The present disclosure describes methods and systems, including computer-implemented methods, computer program products, and computer systems for generating a centralized overview display from annotated data sources.

In an implementation, one or more data sources are identified that each include data to be presented in a user interface. A set of annotations are identified, for each identified data source, that describe the data included in the respective data source. One or more visual representation types are associated with each identified data source. Each visual representation type indicates a type of visual representation to apply when rendering data included in the associated data source. A user interface configuration is generated for the user interface based on the data sources, the annotations, and the associations between the visual representation types and the associated data sources. The user interface is automatically rendered by analyzing and processing the user interface configuration, including rendering, for each association, data from the associated data source according to the associated visual representation.

The above-described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method/the instructions stored on the non-transitory, computer-readable medium.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 5 and 6 illustrate portions of an example configuration file.

FIG. 7 illustrates an example annotations file.

DETAILED DESCRIPTION

An application developer may desire to write an application that presents easily-digestable information related to a business problem. The developer can create or modify a configuration file to include references to data sources and references to annotations that describe the data in the data sources. A player application can read the configuration file and, based on an automatic analysis and processing of the modified configuration file, present a user interface to the user that enables the user to solve the business problem. An approach of adding or modifying metadata in the configuration file can enable the application developer to deploy applications more easily and faster as compared to custom application development that includes writing business logic to extract and present data.

Custom applications can be developed by providing configuration data and UI (User Interface) annotations. Data coming from multiple data sources can be efficiently rendered by a controlling of the entire lifecycle of data requests, data refresh, and UI rendering without pre-knowledge of a specific service or data source. A broad and complete overview of a particular business domain can be provided by enabling the efficient consumption of multiple data services. UI rendering of information coming from each data source can be achieved using a generic player and a set of UI components that each visualize information of a data source based on UI annotations. The lifecycle of the visual representations can be centrally controlled by the generic player application. User actions can be enabled, such as filtering of data sources, navigating to another application with the information of a selected data entry in context, or triggering a business action based on processing related UI annotations and rendering a relevant UI control.

The visualization of data sources can be easily changed by binding a different applicable UI component to a selected data source. For example, a developer may provide an application instance with an initial configuration file that renders a certain data source as a list. A customer administrator/key user can edit the configuration file and change the visualization to another type of visualization, such as a pie chart. Accordingly, customers can easily create variations of a provided application by making a simple change to a configuration file or by creating a new configuration file. Each configuration file variation can result in a new type of an application instance.

Figure 1:
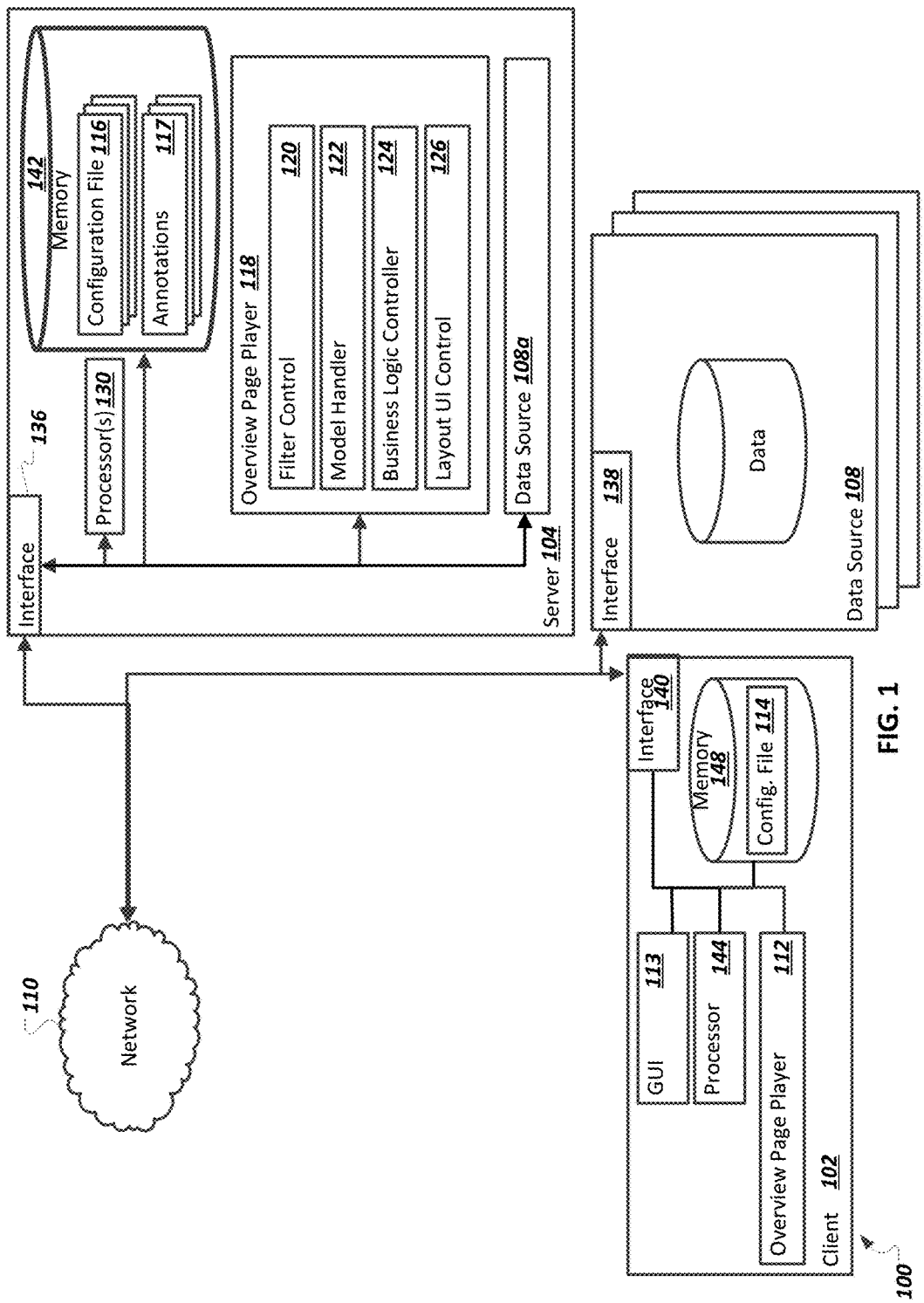
FIG. 1 is a block diagram illustrating an example system for generating a centralized overview display from annotated data sources.

FIG. 1 is a block diagram illustrating an example system 100 for generating a centralized overview display from annotated data sources. Specifically, the illustrated environment 100 includes or is communicably coupled with a client 102, a server 104, one or more data sources 108, and a network 110. The data sources 108 can collectively be data sources associated with different applications, services, application instances, servers or systems.

An overview page player 112 included in the client 104 can present a user interface on a GUI (Graphical User Interface) 113 of the client 102 for presenting data from the data sources 108 and/or a data source 108a local to the server 104. The overview page player 112 can, for example, read a configuration file 114 and present the user interface based on information included in the configuration file 114.

The configuration file 114 can be received by the client 102 as a copy of a configuration file 116 stored on the server 104. The configuration file 114 can be generated on the client 102 or another client device. The configuration file 114 or the configuration file 116 can be generated, for example, by a developer or, in some implementations, automatically by the server 104 or some other system. The configuration file 116 can include one or more references to data sources 108, and/or a reference to the local data source 108a.

Some or all of the data source references included in the configuration file 116 can be associated with a set of annotations that describe the data in a respective data source. A set of annotations can provide rendering hints for data fields, for example. Annotations can also describe actions that are allowed to be performed on the data included in a respective data source. A defined action can be a most probable or most useful action that the user may wish to perform on a data item, for example. Annotations can be included inline within the configuration file 116. As another example, the configuration file 116 can include a reference to a set of annotations 117 that is external to the configuration file 116, where the annotations in the set of annotations 117 are accessed before and/or during usage or execution of the configuration file 116. The configuration file 116 can include, for example, a first URI (Uniform Resource Identifier) that refers to a data source and a second URI that refers to annotations for the data source.

Each data source referenced in the configuration file 116 can be associated with one or more visual representation types. Each visual representation type can indicate a type of visual representation to use when rendering data included in the associated data source. Visual representations can be rendered using "cards" or some other suitable type of representation. Visual representation types include list types, table types, stack cards, and other types, as described in more detail below. Additional visualization types can be added, such as by a developer associated with the server 104 or by a customer or partner.

The overview page player 112 can be received by the client 102 as a copy or instance of an overview page player 118 provided by the server 104. The overview page player 112 can be associated with a set of script code that is sent from the server 104 to the client 102, for execution on the client 102, for example. The overview page player 112 (and the overview page player 118) can include several components, such as a filter control 120, a model handler 122, a business logic controller 124, and a layout UI control 126.

The filter control 120 can enable the user to filter the presented data by a dimension that is included, for example, in each of the data sources referenced in the configuration file 116. The filter control 120 can enable the user to apply a global filter to each of the presented visual representations, for example. A global filter dimension selected using the filter control 120 (e.g., year 2017) can be applied to the data sources 108 for filtering of data presented in the overview page player 112. The model handler 122 can manage requesting and receiving data from the data sources 108, and can include logic to minimize the number of requests for data, for example. The business logic controller 124 can manage the lifecycle of the overview page player 112. The layout UI control 126 can manage the layout of the visual representations that are presented in the overview page player 112. For example, each visual representation can be displayed within a rectangular card area, and the various cards can be arranged in a left-to-right, top-to-bottom order within the overview page player 112. Other visual representation types and arrangements are possible.

The overview page player 112 can present applications associated with various configuration files 116, which may be associated with different sets of data from the similar data sources, different data sources, and/or a combination thereof. For example, the developer can create another configuration file that refers to other data sources 108 to meet a different business need. The developer can create the configuration file 116 and the other configuration file by adding metadata to a respective configuration file. A metadata approach can enable the developer to quickly create multiple applications without having to write custom business logic to extract and present data from various data sources in different applications. Other examples and more details are discussed below.

As used in the present disclosure, the term "computer" is intended to encompass any suitable processing device. For example, although FIG. 1 illustrates a single server 104 and a single client 102, the system 100 can be implemented using a single, stand-alone computing device, two or more servers 104 or two or more clients 102. Indeed, the server 104 and the client 102 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 104 and the client 102 may be adapted to execute any operating system, including Linux, UNIX, Windows, Mac OS®, Java™, Android™, iOS or any other suitable operating system. According to one implementation, the server 104 may also include or be communicably coupled with an e-mail server, a Web server, a caching server, a streaming data server, and/or other suitable server.

Interfaces 136, 138, and 140 are used by the server 104, the data sources 108, and the client 102, respectively, for communicating with other systems in a distributed environment—including within the system 100—connected to the network 110. Generally, the interfaces 136, 138, and 140 each comprise logic encoded in software and/or hardware in a suitable combination and operable to communicate with the network 110. More specifically, the interfaces 136, 138, and 140 may each comprise software supporting one or more communication protocols associated with communications such that the network 110 or interface's hardware is operable to communicate physical signals within and outside of the illustrated system 100.

The server 104 includes one or more processors 130. Each processor 130 may be a central processing unit (CPU), a blade, an application specific integrated circuit (ASIC), a field-programmable gate array (FPGA), or another suitable component. Generally, each processor 130 executes instructions and manipulates data to perform the operations of the server 104. Specifically, each processor 130 executes the functionality required to receive and respond to requests from the client 102, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 104 includes memory 142. In some implementations, the server 104 includes multiple memories. The memory 142 may include any type of memory or database module and may take the form of volatile and/or non-volatile memory including, without limitation, magnetic media, optical media, random access memory (RAM), read-only memory (ROM), removable media, or any other suitable local or remote memory component. The memory 142 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 104.

The client 102 may generally be any computing device operable to connect to or communicate with the server 104 via the network 110 using a wireline or wireless connection. In general, the client 102 comprises an electronic computer device operable to receive, transmit, process, and store any appropriate data associated with the system 100 of FIG. 1. The client 102 can include one or more client applications, including the overview page player 112. A client application is any type of application that allows the client 102 to request and view content on the client 102. In some implementations, a client application can use parameters, metadata, and other information received at launch to access a particular set of data from the server 104. In some instances, a client application may be an agent or client-side version of the one or more enterprise applications running on an enterprise server (not shown).

The client 102 further includes one or more processors 144. Each processor 144 included in the client 102 may be a central processing unit (CPU), an application specific integrated circuit (ASIC), a field-programmable gate array (FPGA), or another suitable component. Generally, each processor 144 included in the client 102 executes instructions and manipulates data to perform the operations of the client 102. Specifically, each processor 144 included in the client 102 executes the functionality required to send requests to the server 104 and to receive and process responses from the server 104.

The client 102 is generally intended to encompass any client computing device such as a laptop/notebook computer, wireless data port, smart phone, personal data assistant (PDA), tablet computing device, one or more processors within these devices, or any other suitable processing device. For example, the client 102 may comprise a computer that includes an input device, such as a keypad, touch screen, or other device that can accept user information, and an output device that conveys information associated with the operation of the server 102, or the client 102 itself, including digital data, visual information, or the GUI 113.

The GUI 113 of the client 102 interfaces with at least a portion of the system 100 for any suitable purpose, including generating a visual representation of the overview page player 112. In particular, the GUI 113 may be used to view and navigate various Web pages. Generally, the GUI 113 provides the user with an efficient and user-friendly presentation of business data provided by or communicated within the system. The GUI 113 may comprise a plurality of customizable frames or views having interactive fields, pull-down lists, and buttons operated by the user. The GUI 113 contemplates any suitable graphical user interface, such as a combination of a generic web browser, intelligent engine, and command line interface (CLI) that processes information and efficiently presents the results to the user visually.

Memory 148 included in the client 102 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including user selections, caches, classes, frameworks, applications, backup data, business objects, jobs, web pages, web page templates, database tables, parameters, repositories storing business and/or dynamic information, and any other appropriate information including any parameters, variables, algorithms, instructions, rules, constraints, or references thereto associated with the purposes of the client 102.

There may be any number of client devices 104 associated with, or external to, the system 100. For example, while the illustrated system 100 includes one client 102, alternative implementations of the system 100 may include multiple client devices 104 communicably coupled to the server 104 and/or the network 110, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client 102 is described in terms of being used by a single user, this disclosure contemplates that many users may use one computer, or that one user may use multiple computers.

Figure 2:
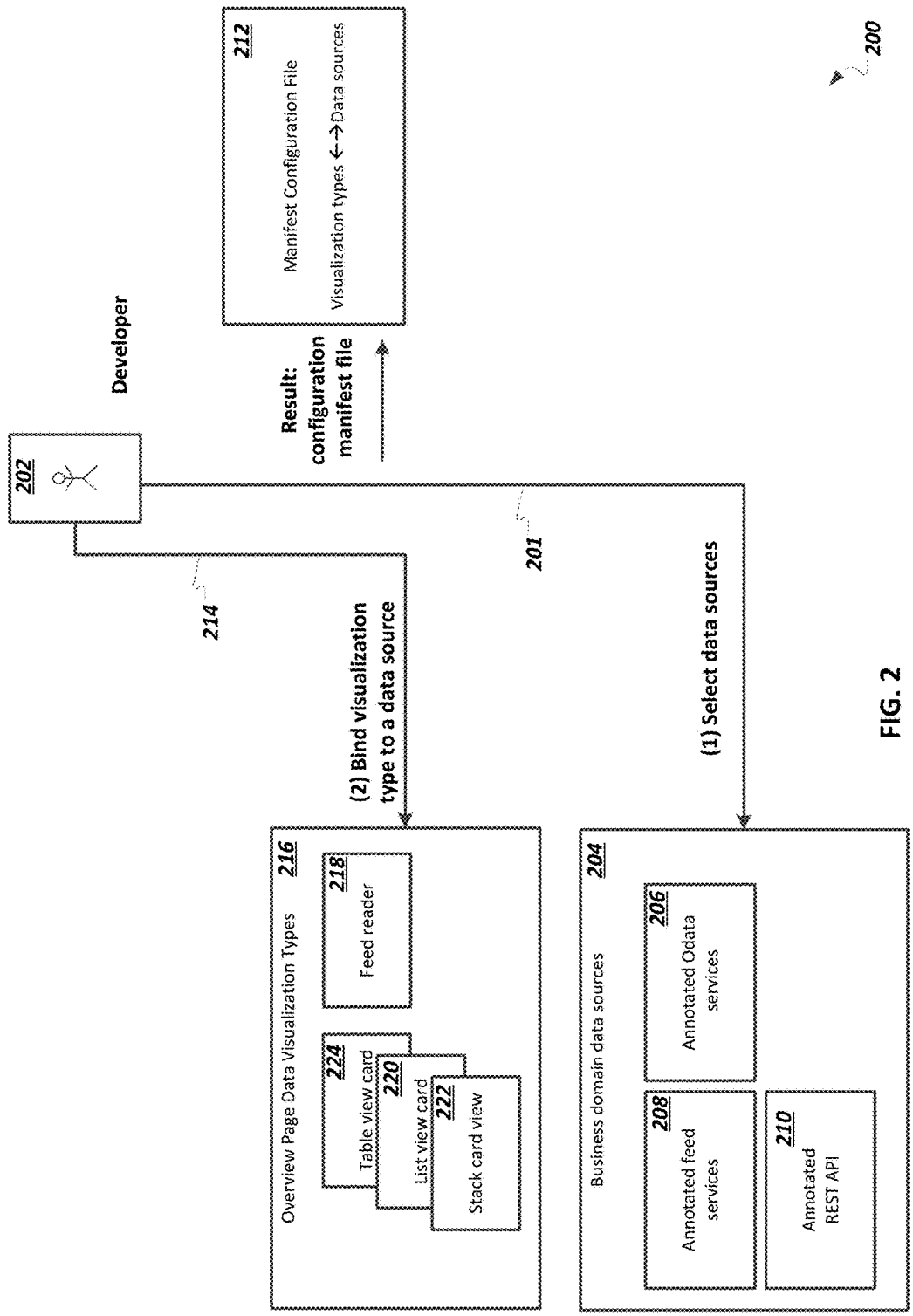
FIG. 2 is a block diagram illustrating an example design-time system for generating a centralized overview display from annotated data sources.

FIG. 2 is a block diagram illustrating an example design-time system 200 for generating a centralized overview display from annotated data sources. Operations are described as being performed by a user 202. The user 202 can be an administrator or a key user who is familiar with a particular business domain, but who may not have experience writing programming logic using a programming language. The user 202 can edit a configuration file, but does not need to write programming logic. As illustrated by an arrow 201, at design time, the user 202 can search for and select one or more business domain data sources 204 for use in an application. The business domain data sources 204 can include, for example, annotated OData services 206, annotated feed services 208, annotated REST (Representational State Transfer) APIs (Application Programming Interfaces) 210, or other types of data sources. The user 202 can specify the selected data sources 204 in a manifest configuration file 212. The user 202 can associate the selected data sources 204 with annotations, as described in more detail below.

As illustrated by an arrow 214, the user 202 can select a set of visualization types 216 to be used to present data from the selected data sources 204 in an application (e.g., in an "overview page"). The user 202 can select one or more visualization types 216 for each selected data source 204. The user 202 can bind each selected visualization type 216 to an associated data source 216 in the configuration file 212, which can then be used by a suitable application (e.g., overview page player 112) to interpret and execute the configuration file 212.

For example, the user 202 can select a feed reader visualization type 218 for an annotated feed service 208. The user 202 can select one visualization type 216 for some or all selected data sources 204 or can select multiple visualization types 216 for some or all selected data sources 204. For example, the user 202 can select a list view card visualization type 220 for the annotated REST API visualization type 210 and a stack card view visualization type 222 and a table view card visualization type 224 for an annotated OData service 206. Using both the stack card view visualization type 222 and the table view card visualization type 224 can enable a user to view data from the annotated OData services data source 206 simultaneously using different types of views. Visualization types are described in more detail below.

Figure 3:
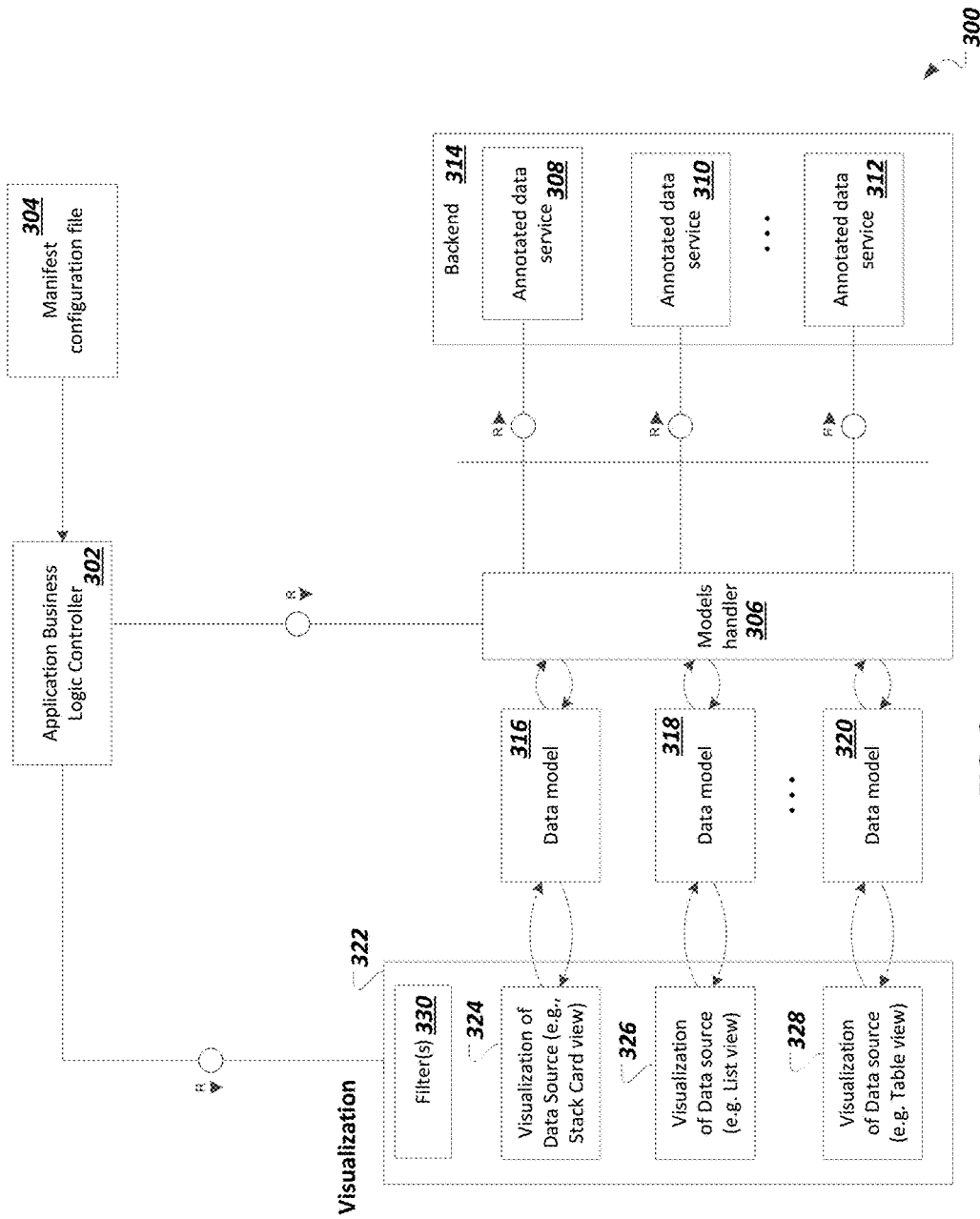
FIG. 3 is a block diagram illustrating an example runtime system for generating a centralized overview display from annotated data sources.

FIG. 3 is a block diagram illustrating an example runtime system 300 for generating a centralized overview display from annotated data sources. An application business logic controller 302 in a player application can read a manifest configuration file 304. The application business logic controller 302 can instantiate a models handler 306 which can establish connections to data sources 308, 310, and 312 (e.g., annotated data services or other types of data sources) provided by one or more backend systems and specified in the manifest configuration file 304.

The models handler 306 can create data models 316, 318, and 320 that are associated with the data sources 308, 310, and 312, respectively. The application business logic controller 302 and the models handler 306 can control the data request lifecycle to fetch data to populate the data models 316, 318, and 320 in an efficient manner that minimizes use of resources. For example, if both the data model 316 and the data model 318 consume a same data source, only a single request may be sent to get data from the backend 314 for the two data models. A visualization component 322 can render data from the data sources 308, 310, and 312, using a stack card visualization 324, a list view visualization 326, and a table view visualization 328, respectively, according to configurations and annotations included in or referenced by the manifest configuration file 312. One or more filter controls 330 can be displayed which can enable the user to filter data presented in the visualizations 324, 326, and 328.

Figure 4:
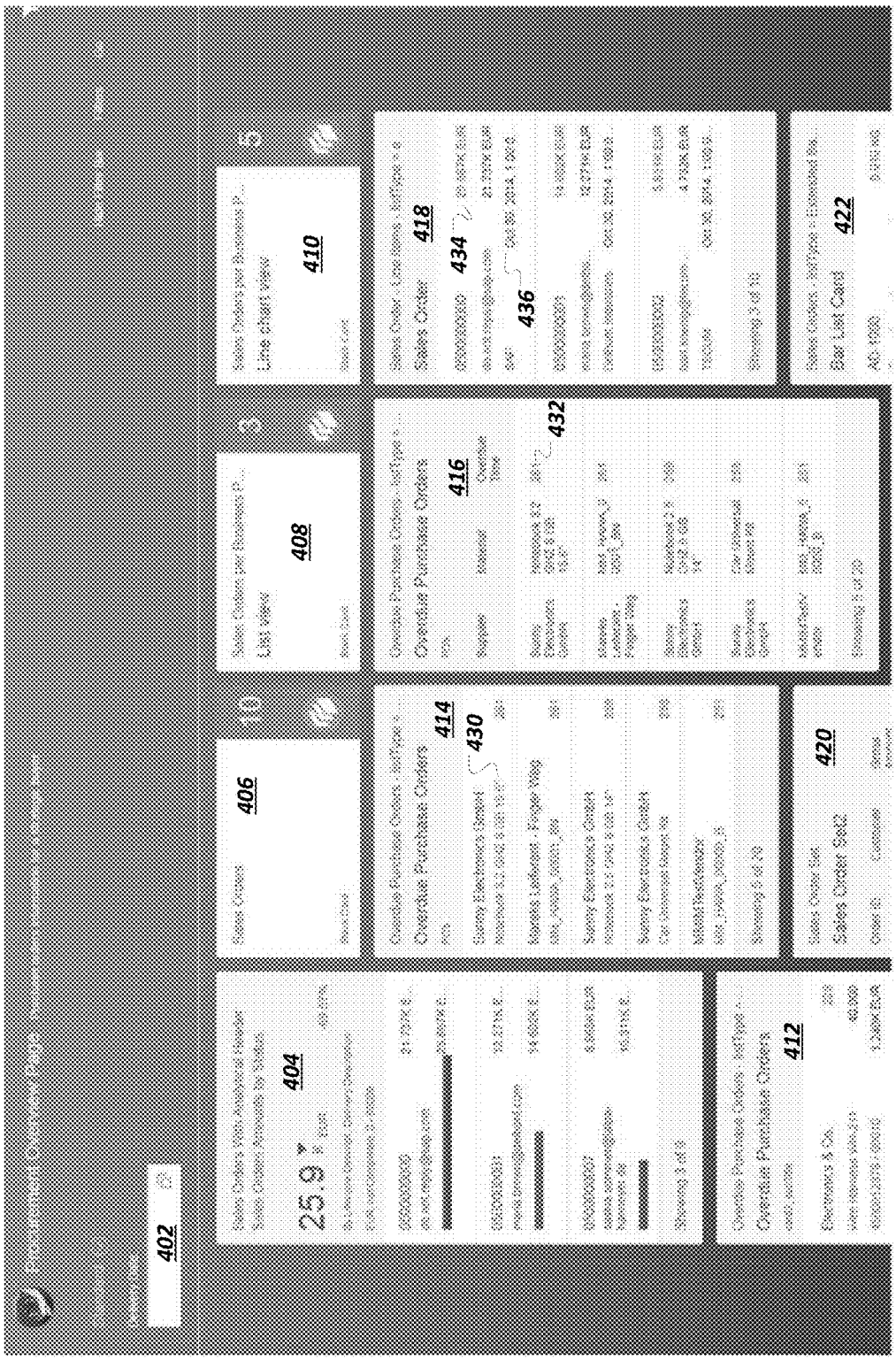
FIG. 4 illustrates an example user interface.

FIG. 4 illustrates an example user interface (UI) 400. The UI 400 is an example procurement overview page which shows purchase order and sales order information related to a strategic buyer. The UI 400 includes a filter 402 and cards 404-422. The card 404 is configured to display sales order data using a bar list.

The card 406 is a stack card that is configured to display sales order data using a stack of cards. If the user selects the card 406, an overlay user interface can be displayed on top of or in place of the card 406, with the overlay user interface including a stack of cards, each card showing information related to a particular sales order, and the overlay user interface enabling the user to navigate to particular card (e.g., using an arrow key or control). The card 408 is a stack card that is configured to display sales orders per business partner using a stack of cards representation, with data for a particular sales order displayed in a list view on the card for the sales order. The card 410 is a stack card that is configured to display sales orders per business partner using a stack of cards representation, with data for a particular sales order displayed in a line chart view on the card for the sales order.

The cards 412, 414 and 416 are configured to display overdue purchase order information in list views. The card 412 is configured to display more information in the list view for the card 412 for each overdue purchase order than in the list view for the card 414. The card 416 is configured to display, in the list view for the card 416, supplier, material, and an overdue time for each overdue purchase order.

The cards 418, 420, and 422 are configured to display sales order information in list views. The card 422 displays information using an extended bar list type of list view.

Data items presented in the user interface 400 can be presented according to annotations that have been identified for the respective data items. Data items presented in the user interface 400 can be annotated as described in more detail below with respect to FIG. 7. Annotations can provide hints as to how to render particular data items in the user interface 400. For example, data item renderings 430, 432, 434, and 436 can appear as displayed in FIG. 4 based on associated respective annotations that indicate that the respective data items correspond to dimension, whole number day count, currency, and date/time values, respectively.

FIG. 5 illustrates a portion 500 of an example configuration file. A data sources section 502 provides information about data sources. A sales order item 504 provides information about a sales order data source and a purchase order item 506 provides information about a purchase order data source. Resource identifier items 508 and 510 specify the locations of the sales order data source and the purchase order data source, respectively. An annotations setting 512 refers to a sales order annotations data source item 514 that defines a sales order annotations data source that provides annotations for the sales order data source. Similarly, an annotations setting 516 refers to a purchase order annotations data source item 518 that defines a purchase order annotations data source that provides annotations for the purchase order data source. Resource identifier items 520 and 522 specify the locations of the sales order annotations data source and the purchase order annotations data source, respectively. When the configuration file is read, the sales order annotations data source and the purchase order annotations data source are identified and analyzed automatically. Although the sales order annotations and purchase order annotations data sources are separate from the sales order and purchase order data sources, respectively, the sales order data source and/or the purchase order data source can include data that is annotated inline in the respective data source.

FIG. 6 illustrates a portion 600 of an example configuration file. A cards section 602 includes definitions of visual representations of data sources (e.g., cards). The cards section 602 includes card definitions 604-622. A model attribute of a card definition can specify a data source that will be represented by a card. For example, a model attribute 624 indicates that the card 604 is to visually represent a sales order data source. As another example, a model attribute 626 indicates that the card 610 is to visually represent a purchase order data source. A data source can be visually represented by multiple cards. For example, a model attribute 628 indicates that the card 608 is to also represent the sales order data source and a model attribute 630 indicates that the card 612 is to also visually represent the purchase order data source.

A value for a template attribute in a card definition can specify a card type associated with the card defined by the card definition. For example, a card type 632 indicates that the card 604 is to display data in a card stack format, as described above for the cards 406, 408, and 410 of the user interface 400. A card type 634 indicates that the card 606 is to display data in an image card format.

A card type 636 and an attribute 638 collectively indicate that the card 608 is to display data using a condensed list. A card type 640 and an attribute 642 indicate that the card 610 is to display data using an extended list. A card type 644 indicates that the card 614 is to display data using a table. A card type 646 and attributes 648 and 650 indicate that the card 620 is to display data using a condensed bar list. A card type 652 and attributes 654 and 656 indicate that the card; 622 is to display data using an extended bar list.

A card definition can include a title attribute which defines a title for a card. The title can be displayed when the card is presented, for example. A title attribute 658 is included in the card definition 604. A value for an attribute, such as a title or another attribute, can come from a data source rather than be statically defined in the configuration file. For example, the card definition 610 includes a placeholder value of "{{card3_title}}" for a title attribute. The placeholder value can be replaced from a value retrieved from an associated data source.

FIG. 7 illustrates an example annotations file 700. The annotations file 700 includes annotations for various data items included in an associated data source. The annotations can provide hints to be used when rendering various annotated data items. For example, an annotation 702 indicates that a Product/WeightMeasure field 704 field is to be rendered as a weight unit. An annotation 706 indicates that a Product/Height field 708 field is to be rendered as a dimension unit. An annotation 710 indicates that a Product/Price field 712 field is to be rendered as a currency value. An annotation 714 indicates that a Product/Category field 716 field is to be rendered as a value list (e.g., the Product/Category field may include multiple values, and the multiple values can be presented in a list).

Figure 8:
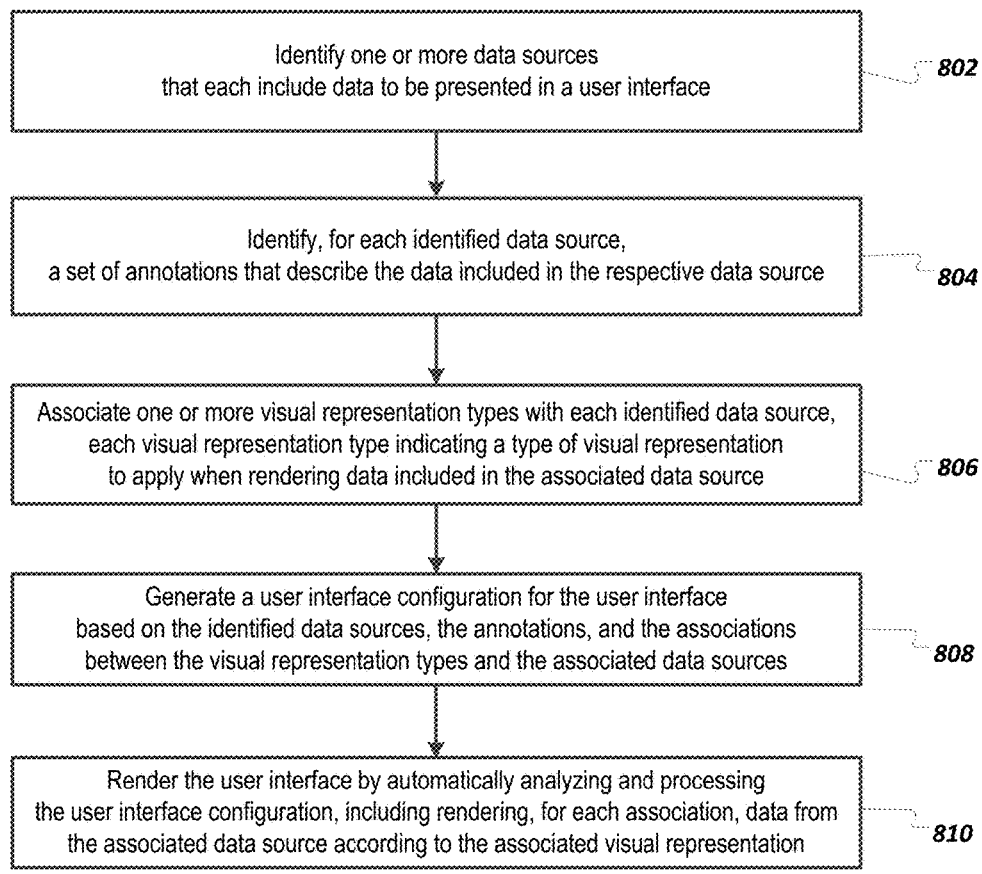
FIG. 8 is a flowchart of an example method for generating a centralized overview display from annotated data sources.

FIG. 8 is a flowchart of an example method 800 for generating a centralized overview display from annotated data sources. For clarity of presentation, the description that follows generally describes method 800 and related methods in the context of FIG. 1. However, it will be understood that method 800 and related methods may be performed, for example, by any other suitable system, environment, software, and hardware, or a combination of systems, environments, software, and hardware, as appropriate. For example, one or more of the server, the client, or other computing device (not illustrated) can be used to execute method 800 and related methods and obtain any data from the memory of the client, the enterprise portal server, or the other computing device (not illustrated).

At 802, one or more data sources that each include data to be presented in a user interface are identified.

At 804, a set of annotations that describe the data included in the respective data source is identified for each identified data source. Each annotation can, for example, provide a hint as to how to render a particular data item included in the respective data source.

At 806, one or more visual representation types are associated with each identified data source. Each visual representation type indicates a type of visual representation to use when rendering data included in the associated data source. Multiple visual representation types can be associated with a same data source. The visual representation types can include a list view, a table view, and a stack card view.

At 808, a user interface configuration is generated for the user interface based on the identified data sources, the annotations, and the associations between the visual representation types and the associated data sources. The user interface configuration can be included in a manifest configuration file, for example.

At 810, the user interface is rendered by automatically analyzing and processing the user interface configuration. Data is rendered, for each association, from the associated data source according to the associated visual representation. The visual representations can be each displayed in a card view on the user interface. Rendering can include presenting a filter control which can enable the user to select a dimension by which to filter the data in the one or more data sources. When the one or more data sources include two or more data sources the filter dimension can be a dimension common to the two or more data sources. The filter dimension common to the two or more data sources can be automatically determined.

Described implementations of the subject matter can include one or more features, alone or in combination. For example, in a first implementation, a computer-implemented method includes: identifying one or more data sources that each include data to be presented in a user interface; identifying, for each identified data source, a set of annotations that describe the data included in the respective data source; associating one or more visual representation types with each identified data source, each visual representation type indicating a type of visual representation to apply when rendering data included in the associated data source; generating a user interface configuration for the user interface based on the identified data sources, the annotations, and the associations between the visual representation types and the associated data sources; and rendering the user interface by automatically analyzing and processing the user interface configuration, including rendering, for each association, data from the associated data source according to the associated visual representation.

The foregoing and other described implementations can each optionally include one or more of the following features:

A first feature, combinable with any of the following features, comprising: identifying a dimension by which to filter the data in the one or more data sources; and filtering the data from the one or more data sources by the identified filter dimension.

A second feature, combinable with any of the previous or following features, wherein the one or more data sources include two or more data sources and the filter dimension is a dimension common to the two or more data sources.

A third feature, combinable with any of the previous or following features, wherein the filter dimension common to the two or more data sources is automatically determined.

A fourth feature, combinable with any of the previous or following features, wherein multiple visual representation types are associated with a same data source.

A fifth feature, combinable with any of the previous or following features, wherein the visual representations are each displayed in a card view on the user interface.

A sixth feature, combinable with any of the previous or following features, wherein the visual representation types include a list view, a table view, and a stack card view.

A seventh feature, combinable with any of the previous or following features, wherein multiple visualization types are associated with a same data source and rendering comprises: determining that the multiple visualizations refer to the same data source; and retrieving data for the data source for the multiple visualization types using a single data request.

An eighth feature, combinable with any of the previous or following features, wherein a visualization type is associated with multiple data sources and rendering comprises retrieving data for the multiple data sources using a single data request.

A ninth feature, combinable with any of the previous or following features, comprising: receiving a modification to the user interface configuration to associate a new type of visual representation to apply when rendering data included in a first data source referenced in the user interface configuration; and re-rendering the user interface by automatically analyzing and processing the modified user interface configuration, including rendering data from the first data source according to the new type of visual representation.

In a second implementation, a non-transitory, computer-readable medium storing computer-readable instructions executable by a computer is configured to: identify one or more data sources that each include data to be presented in a user interface; identify, for each identified data source, a set of annotations that describe the data included in the respective data source; associate one or more visual representation types with each identified data source, each visual representation type indicating a type of visual representation to apply when rendering data included in the associated data source; generate a user interface configuration for the user interface based on the identified data sources, the annotations, and the associations between the visual representation types and the associated data sources; and render the user interface by automatically analyzing and processing the user interface configuration, including rendering, for each association, data from the associated data source according to the associated visual representation.

The foregoing and other described implementations can each optionally include one or more of the following features:

A first feature, comprising: identifying a dimension by which to filter the data in the one or more data sources; and filtering the data from the one or more data sources by the identified filter dimension.

A second feature, combinable with any of the previous or following features, wherein the one or more data sources include two or more data sources and the filter dimension is a dimension common to the two or more data sources.

A third feature, combinable with any of the previous or following features, wherein the filter dimension common to the two or more data sources is automatically determined.

A fourth feature, combinable with any of the previous or following features, wherein multiple visual representation types are associated with a same data source.

A fifth feature, combinable with any of the previous or following features, wherein the visual representations are each displayed in a card view on the user interface.

A sixth feature, combinable with any of the previous or following features, wherein the visual representation types include a list view, a table view, and a stack card view.

A seventh feature, combinable with any of the previous or following features, wherein multiple visualization types are associated with a same data source and rendering comprises: determining that the multiple visualizations refer to the same data source; and retrieving data for the data source for the multiple visualization types using a single data request.

An eighth feature, combinable with any of the previous or following features, wherein a visualization type is associated with multiple data sources and rendering comprises retrieving data for the multiple data sources using a single data request.

A ninth feature, combinable with any of the previous or following features, comprising: receiving a modification to the user interface configuration to associate a new type of visual representation to apply when rendering data included in a first data source referenced in the user interface configuration; and re-rendering the user interface by automatically analyzing and processing the modified user interface configuration, including rendering data from the first data source according to the new type of visual representation.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks.

The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an application programming interface (API) or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, the method comprising:

identifying, in a configuration file, multiple, different data sources that each include data to be presented in a user interface, the multiple, different data sources including a first data source;

identifying, in the configuration file, for each identified data source, a set of annotations that describe the data included in the respective data source;

identifying, in the configuration file, a set of associations, wherein each association associates a visual representation type with a given identified data source of the multiple, different data sources, and wherein each visual representation type indicates a type of visual representation to apply when rendering data included in the associated data source, including identifying, in the configuration file, multiple, different visualization types associated with the first data source;

identifying, in the annotations, for each identified data source, a set of actions that are allowed to be performed on the data included in the respective data source;

generating a user interface based on the identified data sources, the annotations, and the associations between the visual representation types and the associated data sources;

retrieving data for the multiple, different data sources, including retrieving data for the first data source, for the multiple, different visualization types, using a single data request; and rendering data for each of the multiple, different data sources in the user interface, including:
rendering, for each association, data from the associated data source according to the associated visual representation; and
rendering the data from the first data source in each of multiple, different visualizations each respectively corresponding to one of the multiple, different visualization types; and enabling, for each visualization, each action in the set of actions identified for the data source associated with the visualization;

receiving a user input requesting a first action to be performed on data of the first source; and in response to receiving the user input, performing the first action using data of the first data source.

2. The method of claim 1, further comprising:
identifying a dimension by which to filter the data in the multiple, different data sources; and filtering the data from the multiple, different data sources by the identified filter dimension.

3. The method of claim 2, wherein the filter dimension is a dimension common to two or more data sources.

4. The method of claim 3, wherein the filter dimension common to the two or more data sources is automatically determined.

5. The method of claim 1, wherein the visual representations are each displayed in a card view on the user interface.

6. The method of claim 1, wherein the visual representation types include a list view, a table view, and a stack card view.

7. The method of claim 1, wherein the multiple, different data sources comprise database tables.

8. The method of claim 1, further comprising:
receiving a modification to the configuration file to associate a new type of visual representation to apply when rendering data included in a second data source referenced in the configuration file; and
re-rendering the user interface by automatically analyzing and processing the modified configuration file, including rendering data from the second data source according to the new type of visual representation.

9. A system comprising:
one or more computers; and
a computer-readable medium coupled to the one or more computers having instructions stored thereon which, when executed by the one or more computers, cause the one or more computers to perform operations comprising:
identifying, in a configuration file, multiple, different data sources that each include data to be presented in a user interface, the multiple, different data sources including a first data source;
identifying, in the configuration file, for each identified data source, a set of annotations that describe the data included in the respective data source;
identifying, in the configuration file, a set of associations, wherein each association associates a visual representation type with a given identified data source of the multiple, different data sources, and wherein each visual representation type indicates a type of visual representation to apply when rendering data included in the associated data source, including identifying, in the configuration file, multiple, different visualization types associated with the first data source;
identifying, in the annotations, for each identified data source, a set of actions that are allowed to be performed on the data included in the respective data source;
generating a user interface based on the identified data sources, the annotations, and the associations between the visual representation types and the associated data sources;
retrieving data for the multiple, different data sources, including retrieving data for the first data source, for the multiple, different visualization types, using a single data request; and
rendering data for each of the multiple, different data sources in the user interface, including:
rendering, for each association, data from the associated data source according to the associated visual representation; and
rendering the data from the first data source in each of multiple, different visualizations each respectively corresponding to one of the multiple, different visualization types; and
enabling, for each visualization, each action in the set of actions identified for the data source associated with the visualization;
receiving a user input requesting a first action to be performed on data of the first source; and
in response to receiving the user input, performing the first action using data of the first data source.

10. The system of claim 9, the operations further comprising:
identifying a dimension by which to filter the data in the multiple, different data sources; and
filtering the data from the multiple, different data sources by the identified filter dimension.

11. The system of claim 10, wherein the filter dimension is a dimension common to two or more data sources.

12. The system of claim 11, wherein the filter dimension common to the two or more data sources is automatically determined.

13. A computer program product encoded on a non-transitory storage medium, the product comprising non-transitory, computer readable instructions for causing one or more processors to perform operations comprising:
identifying, in a configuration file, multiple, different data sources that each include data to be presented in a user interface, the multiple, different data sources including a first data source;
identifying, in the configuration file, for each identified data source, a set of annotations that describe the data included in the respective data source;
identifying, in the configuration file, a set of associations, wherein each association associates a visual representation type with a given identified data source of the multiple, different data sources, and wherein each visual representation type indicates a type of visual representation to apply when rendering data included in the associated data source, including identifying, in the configuration file, multiple, different visualization types associated with the first data source;
identifying, in the annotations, for each identified data source, a set of actions that are allowed to be performed on the data included in the respective data source;
generating a user interface based on the identified data sources, the annotations, and the associations between the visual representation types and the associated data sources;
retrieving data for the multiple, different data sources, including retrieving data for the first data source, for the multiple, different visualization types, using a single data request; and
rendering data for each of the multiple, different data sources in the user interface, including:
rendering, for each association, data from the associated data source according to the associated visual representation; and
rendering the data from the first data source in each of multiple, different visualizations each respectively corresponding to one of the multiple, different visualization types; and
enabling, for each visualization, each action in the set of actions identified for the data source associated with the visualization;
receiving a user input requesting a first action to be performed on data of the first source; and
in response to receiving the user input, performing the first action using data of the first data source.

14. The computer program product of claim 13, the operations further comprising:

identifying a dimension by which to filter the data in the multiple, different data sources; and filtering the data from the multiple, different data sources by the identified filter dimension.

15. The computer program product of claim 14, wherein the filter dimension is a dimension common to two or more data sources.

16. The computer program product of claim 15, wherein the filter dimension common to the two or more data sources is automatically determined.

\* \* \* \* \*